United States Patent [19]

Nussbaumer

[11] 4,179,131

[45] Dec. 18, 1979

[54] SEAL ARRANGEMENTS

[75] Inventor: Thomas Nussbaumer, Zug, Switzerland

[73] Assignee: Patent & Inventions Ltd., Zug, Switzerland

[21] Appl. No.: 853,191

[22] Filed: Nov. 21, 1977

[30] Foreign Application Priority Data

Nov. 23, 1976 [CH] Switzerland ............... 14689/76

[51] Int. Cl.² ..................... F16J 15/16; F16J 9/08
[52] U.S. Cl. .................... 277/165; 277/188 R; 92/168
[58] Field of Search ............. 277/3, 27, 152, 154, 277/188 R, 165, 198, 188 A, 215, 189; 92/165 R, 168

[56] References Cited

U.S. PATENT DOCUMENTS

| Re. 28,105 | 8/1974 | Traub ..................... 277/165 |
| 2,915,349 | 12/1959 | Gomberg ............... 277/165 |
| 3,328,041 | 6/1967 | Bloom et al. ........... 277/165 |
| 3,394,941 | 7/1968 | Traub ................ 277/188 R X |
| 3,469,853 | 9/1969 | Gullick ............. 277/188 R X |
| 3,549,154 | 12/1970 | Jones ........................ 92/168 X |
| 3,636,824 | 1/1972 | Clark .................... 277/165 X |
| 3,860,250 | 1/1975 | Lundquist ............... 277/165 |

FOREIGN PATENT DOCUMENTS

| 453933 | 1/1949 | Canada ............... 277/188 R |
| 862989 | 1/1953 | Fed. Rep. of Germany . |
| 1066708 | 1/1954 | France . |
| 1292024 | 3/1962 | France . |
| 668356 | 3/1952 | United Kingdom ........... 277/165 |

*Primary Examiner*—Robert S. Ward, Jr.
*Attorney, Agent, or Firm*—Werner W. Kleeman

[57] ABSTRACT

A seal arrangement comprising three sealing rings. The first ring is intended to locate in a groove in a first machine element and has a bearing surface by which it is bearable against the base of the groove of the first machine element, and a surface spaced from its bearing surface. The second ring has a first bearing surface by which it is bearable against the spaced surface of the first ring, and a second bearing surface which is spaced from its first bearing surface, contactable with surface portions of a second machine element and has an annular groove. The third ring is intended to locate in the annular groove of the second sealing ring and has a first bearing surface by which it is bearable against a wall portion of the groove of the second sealing ring, and a second bearing surface which is spaced from its first bearing surface and which is bearable against the second machine element. The second ring has a modulus of elasticity which is greater than that of the first ring and greater than that of the third ring. The third ring is of such a size and shape that when it is located in the groove of the second ring a radial spacing between its second bearing surface and the first bearing surface of the second ring is at least equal to a radial distance between the second and first bearing surfaces of the second ring.

12 Claims, 2 Drawing Figures

SEAL ARRANGEMENTS

BACKGROUND OF THE INVENTION

The present invention relates to a seal arrangement for sealing two machine elements.

A multiplicity of sealing problems arise in hydraulic and pneumatic machines and devices. The designer sets different requirements on a seal arrangement according to the envisaged use. Such demands include, that the seal arrangement takes up little space and is easily assemblable. Furthermore, the seal arrangement should seal well and have a long life in the envisaged pressure and temperature range. In case the seal arrangement serves for the sealing of a gap between two parts moving relative to one another, the seal arrangement should cause only the smallest possible friction during the motion and also result in little static friction. Otherwise, there is the danger that, for example in the case of hydraulic cylinders, the pistons on starting out of the rest position will not move uniformly, but jerkily (stick slip).

When a seal arrangement is provided perhaps for the sealing of a piston in a hydraulic cylinder for a great pressure range of, for example, 0 to 500 bar, it should have different properties which are in part opposed to one another. The seal arrangement should be easily deformable so that it closes off well at small pressures and when used with stationary parts, but nevertheless should slide easily on displacement of the piston. Also at high pressures it should not be pressed into gaps present because of the required play between the machine parts to be sealed.

Different kinds of seal arrangements are known which only partially fulfil various requirements. For example, a seal arrangement is known which comprises two rings for insertion into an annular groove of a piston arranged in an hydraulic cylinder. The one, inner, ring of the seal arrangement consists of an elastomer and bears by its inside surface against the base of the annular groove. The other, outer, ring consists of polytetrafluoroethylene and bears by its inside surface against the outside surface of the elastomer ring. The outer surface of the outer ring bears against the inside surface of the hydraulic cylinder. This known seal arrangement is quite well suited for oil at high pressure. At low pressures and particularly with gaseous flow media, it affords incomplete sealing due to the small elasticity of the polytetrafluoroethylene.

An object of the present invention is to provide a seal which is usable at high as well as also at low pressures and for liquids as well as for gases.

SUMMARY OF THE INVENTION

According to the present invention there is provided a seal arrangement comprising a first sealing ring intended to locate in a groove in a first machine element and having a bearing surface by which said first sealing ring is bearable against the base of said groove of said first machine element, and a surface spaced from said bearing surface, a second sealing ring having a first bearing surface by which said second sealing ring is bearable against said spaced surface of said first sealing ring, and a second bearing surface which is spaced from said first bearing surface of said second sealing ring, contactable with surface portions of a second machine element and which is provided with an annular groove therein, a third sealing ring intended to locate in said annular groove of said second sealing ring and having a first bearing surface by which said third sealing ring is bearable against a wall portion of said groove of said second sealing ring, and a second bearing surface which is spaced from said first bearing surface of said third sealing ring and which is bearable against said second machine element, wherein said second sealing ring has a modulus of elasticity which is greater than the modulus of elasticity of said first sealing ring and greater than the modulus of elasticity of said third sealing ring, and wherein said third sealing ring is of such a size and shape that when said third sealing ring is located in said groove of said second sealing ring a radial spacing between said second bearing surface of said third sealing ring and said first bearing surface of said second sealing ring is at least equal to a radial spacing between said second bearing surface and said first bearing surface of said second sealing ring.

BRIEF DESCRIPTION OF THE DRAWINGS

An embodiment of the present invention will now be more particularly described by way of example and with reference to the accompanying drawings in which.

DETAILED DESCRIPTION OF THE PREFERRED EMBODIMENTS

Figure 1:
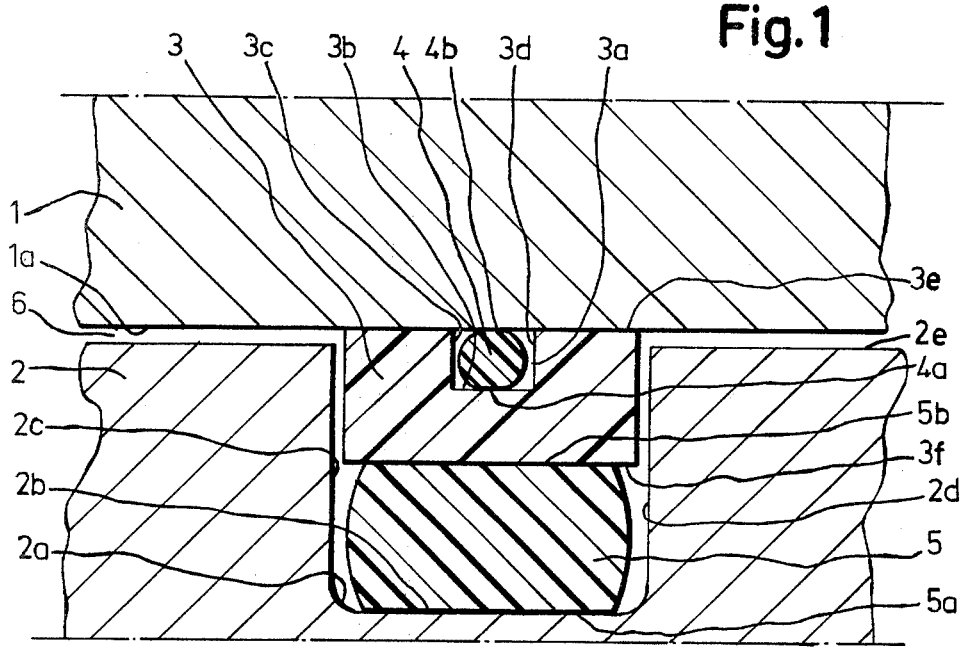
FIG. 1 shows a section through two machine elements, one of which has an annular groove with an inserted seal arrangement.

Referring now to the drawings, sections of a first machine element 1 and a second machine element 2 are shown in FIG. 1. The machine element 1 has a surface 1a, which faces a surface 2e of the machine element 2. The two machine elements 1 and 2 are movable relative to one another, wherein a gap 6 is present between the two surfaces 1a and 2e for play required for the movability. The surfaces 1a and 2e bounding the gap 6 can be cylindrical surfaces co-axial with each other. The machine element 1 can be an hydraulic cylinder and the machine element 2 a piston. However, the two elements may be, for example, a shaft and a bearing. The elements 1 and 2 comprise metal, for example steal, cast iron or bronze depending on their task and construction.

The machine element 2 is provided with an annular groove 2a co-axial with the axes of the two elements. The groove has a base 2b and two side walls 2c and 2d. The groove 2a has a substantially rectangular cross-section, the transitions between the base 2b and the side walls 2c and 2d being rounded.

A seal arrangement comprising three rings of synthetic material, is arranged in the annular groove 2a. A first ring 5 bears by its inwardly disposed bearing surface 5a against the base 2b of the annular groove 2a. The next, outer, second ring 3 bears by its inner surface 3f on the outside surface 5b of the ring 5 remote from the bearing surface 5a. The second ring 3 is provided on its side remote from the first ring 5 with an annular groove 3a, which is approximately rectangular in cross-section, co-axial with the annular groove 2a and has a base 3b and side walls 3c and 3d. A third ring 4, is arranged in the groove 3a and has a surface 4a by which the ring bears against the base 3b of the groove 3a. The second and the third ring have surfaces 3e and 4b, respectively, remote from the first ring by which the second and third ring bear against the machine element 1.

The first ring 5 and the third ring 4 are made of rubber-elastic and have a modulus of elasticity in tension of about 1 kilopond per square centimeter up to at most about 2000 kiloponds per square centimeter and a Shore-A-hardness of about 30 to 90. The first and the third ring thus consist of an elastomer. Elastomer includes such synthetic materials which in their basic composition are not rubber-elastic, but become rubber-elastic by the addition of plasticizers. Such a substance is, for example, the socalled semi-rigid polyamide containing a plasticizer.

The second ring 3 has a modulus of elasticity in tension of at least about 3000 kiloponds per square centimeter up to at most about 25000 kiloponds per square centimeter. It can for example consist of a polycarbonfluoride, possibly polytetrafluoroethylene with a modulus of elasticity of about 7500 kiloponds per square centimeter and a Shore-D-hardness of about 55 to 65. The second ring 3 can, however, for example, also consist of a high molecular polyethylene which has a Shore-D-hardness of about 60 to 66 and a modulus of elasticity in shear of about 10000 kiloponds per square centimeter.

The depths of the two annular grooves 2a and 3a and the dimensions of the three rings 5, 3 and 4 are adapted to one another as well as to the spacing of the two machine elements 1 and 2 in such a manner that the two rubber-elastic rings 5 and 4 are compressed somewhat or, i.e. the thickness of the ring 4, measured at right angles to the groove base 3b, is greater than the depth of the groove 3a so that the ring 4 protrudes out of the groove 4a before the assembly of the machine elements 1 and 2 and also extends at least up to the surface 2e. The sum of the thickness of the rings 3 and 5, measured at right angles to the groove base 2b, is greater than the depth of the groove 2a so that the second ring 3 protrudes out of the groove 2a, i.e. beyond the surface 2e. The first ring 5 therefore bears under bias against the bottom 2b of the groove 2a and presses the second ring 3 against the machine element 1. The free ends of the sections of the second ring 3 disposed to both sides of the groove 3a therefore bear against the surface 1a. Accordingly, the ring 4 also bears under bias against the surface 1a.

If the machine elements, like a piston and cylinder, move relative to one another at right angles to the annular groove, rings which originally, i.e. before compression, had a non-circular cross-sectional shape, may be used as first and third rings. When their dimensions in the transverse direction of the grooves is greater than that perpendicularly to the groove bases, any tendency to roll to and fro on the groove bases transversely to the grooves is avoided. The first and third rings may, for example, before compression, have a substantially elliptical or oval cross-section. The surface 3e and 3f of the second ring 3 are preferably parallel to or co-axial with the surface 1a.

Figure 2:
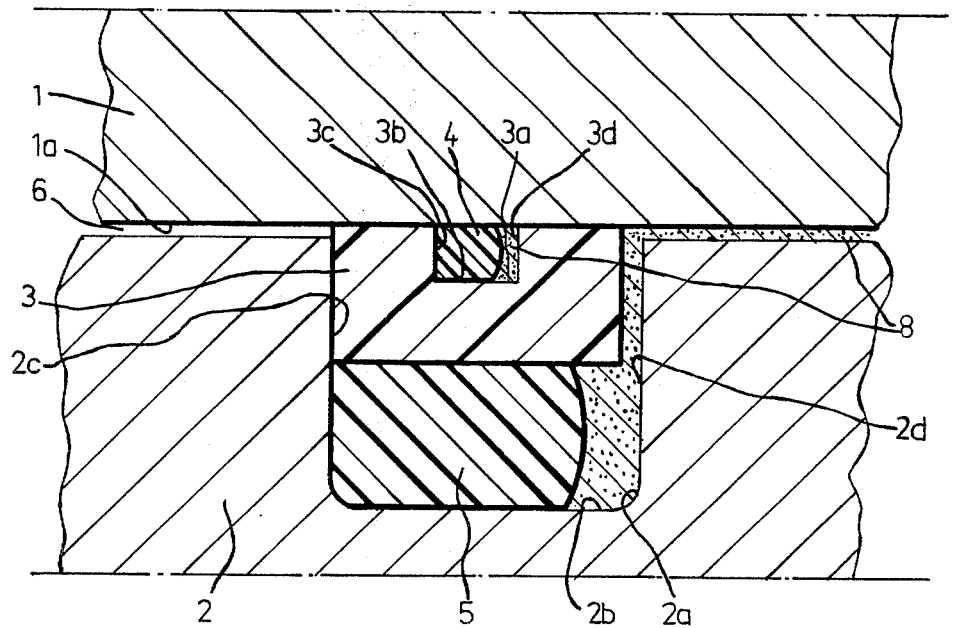
FIG. 2 shows a section corresponding to FIG. 1, with hydraulic means engaging one side at the rings of the seal arrangement.

FIG. 2 shows the position of the rings when a flow medium 8, for example oil, under pressure is present on the right-hand side (as shown in FIG. 2) of the seal arrangement. The first ring 5 and the second ring 3 are pressed by the flow medium against the left-hand side wall 2c of the annular groove 2a. The third ring 4 is pressed against the side wall 3c of the annular groove 3a. The first and the third ring ensure good sealing by their good deformability. Since the first ring 5 presses the second ring 3 against the surface 1a of the first machine element 1, practically no gap is present between the second ring 3 and the surface 1a. The third ring 4 can therefore not be pressed out of the annular groove 3a and also not be damaged by extrusion. Since the second ring 3 bears against the groove side wall 2c without a gap the first ring 5 can not be extruded and damaged.

The bias of the first ring 5 is determined in such a manner that the second ring 3 is pressed against the surface 1a with only a relatively small force so that the extrusion of the third ring 4 is just avoided. Thereby, friction can be kept correspondingly small. If a cylinder and a piston constitute the two machine elements 1 and 2, slight friction provides the advantage that the piston executes a slow and steady movement on the action of a small direct or differential force. The jerky kind of motion (Stick slip) in which the piston is set into motion only on the application of a relatively large force and then stops due to the inadequate following stroke of hydraulic force, can thus be largely avoided by the above seal arrangement.

The above described seal arrangement provides reliable sealing in a very large pressure range of, for example, 0 to 500 bar. The upper pressure limit is determined primarely by the size of the gap 6 and by the flow resistance of the second ring 3, whilst the hardness of the first and third ring are immaterial for this. The deformability of the two rubber-elastic rings 5 and 4, especially that of the third ring 4, is decisive for the tightness at low pressures. Since the second ring 3 is pressed against the surface 1a only relatively weakly, keeping the friction low, it can not interrupt the flow along the film of liquid adhering to the surface 1a or, in the case of a gaseous flow medium, along the gas layer. Compared therewith, the rubber-elastic third ring 4 ensures a "drying-off" of the film of liquid and reliable sealing without it rolling off along the surface 1a on displacement of the piston.

Since the seal arrangement is symmetrical, good tightness is ensured in the case of pressure loading on both sides of the seal arrangement with liquid as well as with gaseous flow media.

The machine elements 1 and 2 can rotate relative to one another around the axis of symmetry of the seal or execute a rotational as well as a translational motion. The materials and surfaces have such properties that the coefficient of friction between the machine element 1 and the second ring 3 is lower than that between the rings 3 and 5 and is also lower than that between the ring 5 and the machine element 2. The rings 3 and 5 therefore remain stationary on rotation with respect to the machine element 2. The friction between the third ring 4 and the first machine element 1 is greater than that between the second and third ring. When the two machine elements rotate relative to one another, the third ring 4 remains fast with respect to the first machine element and slides along the base 3b of the groove 3a. The motional surfaces of the groove 3a are smooth so that the third ring 4 is not damaged in any manner during the rotation.

The above seal arrangement can thus be used to seal machine parts against each other, which execute a translational and/or rotational motion relative to one another. Elements resting relative to each other can be sealed against each other. The materials may be chosen to be appropriate to the envisaged pressure and temperature ranges as well as to the chemical and physical properties of the flow media so that optimal properties result.

The seal arrangement requires relatively little space. The rubber-elastic rings 5 and 3 may be inserted into the corresponding grooves by temporarily stretching them. The less stretchable second ring 2 can, in the case of a ring with an annular diameter of more than about 60 millimeters, be inserted into the annular groove 2a by briefly stretching it. In the case of rings of smaller diameters, the machine element 2 can be constructed in two parts, detachably connected with one another and together bounding the groove 2a. Furthermore, the second ring may be split at any location of its periphery. If no rotation takes place, it is quite adequate for the two surfaces of separation of the ring to freely abut against each other.

The surfaces 1a and 2e of the two machine elements do not necessarily have to be co-axial. In the case of the two machine elements 1 and 2, there can be, for example, two flanges with planar surfaces 1a and 2a facing each other. The groove 2a and the three rings 3, 4 and 5 need in this case not necessarily have to run along a circular line, but can for example run along an oval or a rectangle with rounded corners.

While there are shown and described present preferred embodiments of the invention, it is to be distinctly understood that the invention is not limited thereto, but may be otherwise variously embodied and practiced within the scope of the following claims.

ACCORDINGLY,

I claim:

1. A seal arrangement comprising:
   (a) a first sealing ring intended to locate in a groove in a first machine element and having a bearing surface by which said first sealing ring is bearable against the base of said groove of said first machine element, and a surface spaced from said bearing surface,
   (b) a second sealing ring having a first bearing surface by which said second sealing ring is bearable against said spaced surface of said first sealing ring, and a second bearing surface which is spaced from said first bearing surface of said second sealing ring, contactable with surface portions of a second machine element and which is provided with an annular groove therein,
   (c) a third sealing ring intended to locate in said annular groove of said second sealing ring and having a first bearing surface by which said third sealing ring is bearable against a wall portion of said groove of said second sealing ring, and a second bearing surface which is spaced from said first bearing surface of said third sealing ring and which is bearable against said second machine element, wherein said second sealing ring is formed of a deformable synthetic material and has a modulus of elasticity which is greater than the modulus of elasticity of said first sealing ring and greater than the modulus of elasticity of said third sealing ring, said modulus of elasticity of said second ring being in the range of 3000 to 25000 kiloponds per square centimeter, and wherein said third sealing ring is of such a size and shape that when said third sealing ring is located in said groove of said second sealing ring a radial spacing between said second bearing surface of said third sealing ring and said first bearing surface of said second sealing ring is at least equal to a radial spacing between said second bearing surface and said first bearing surface of said second sealing ring.

2. An arrangement as defined in claim 1, wherein at least one of said first and second sealing rings has a cross-sectional dimension in a radial direction which is less than a cross-sectional dimension in an axial direction.

3. An arrangement as defined in claim 1, wherein at least one of said first and third sealing rings has a substantially elliptical cross-section, 4. An arrangement as claimed in claim 1, wherein at least one of said first and third sealing rings has a substantially oval cross-section.

5. An arrangement as defined in claim 1, wherein said first bearing surface and said second bearing surface of said second sealing ring each are co-axial with said bearing surface of said first sealing ring.

6. An arrangement as defined in claim 1, wherein at least one of said first and third sealing rings comprises an elastomer.

7. An arrangement as defined in claim 1, wherein said second sealing ring comprises a polycarbonfluoride.

8. An arrangement as defined in claim 1, wherein said second sealing ring comprises polyethylene.

9. An arrangement as defined in claim 1, wherein said first and third sealing rings have a Shore-A hardness of 30 to 90.

10. An arrangement as defined in claim 1, wherein said first and third sealing rings each have a respective modulus of elasticity of at most 2000 kiloponds per square centimeter.

11. A machine provided with a sealing arrangement as defined in claim 1 and comprising a first machine element provided with an annular groove, said sealing arrangement being located in said annular groove, said first second and third sealing rings each being of such a size that said first sealing ring exerts a force by its bearing surface against the base of said first machine element, and said respective second bearing surfaces of said second and third sealing rings contact a second machine element, said third sealing ring exerting a force on said second machine element by its said second bearing surface.

12. A machine as claimed in claim 11, wherein said first machine element has a cylindrical outer surface and said second machine element has a cylindrical inner surface spaced from and surrounding said cylindrical outer surface of said first machine element, said space being sealed by said sealing arrangement.

* * * * *